(12) United States Patent
Markfort (10) Patent No.: US 8,002,075 B2
(45) Date of Patent: Aug. 23, 2011

(54) STEERING DEVICE FOR A SUPERPOSITION STEERING SYSTEM

(75) Inventor: Dieter Markfort, Berlin (DE)

(73) Assignee: Takata-Petri AG, Aschaffenburg (DE)

( * ) Notice: Subject to any disclaimer, the term of this patent is extended or adjusted under 35 U.S.C. 154(b) by 0 days.

(21) Appl. No.: 12/016,722

(22) Filed: Jan. 18, 2008

(65) Prior Publication Data

US 2008/0141814 A1 Jun. 19, 2008

Related U.S. Application Data (63) Continuation of application No. PCT/DE2006/001151, filed on Jun. 29, 2006.

(30) Foreign Application Priority Data

Jul. 20, 2005 (DE) .......................... 10 2005 034 636

(51) Int. Cl.
*B62D 1/04* (2006.01)

(52) U.S. Cl. ......... 180/443; 180/444; 180/446; 280/192

(58) Field of Classification Search .................. 180/443, 180/444, 446; 280/192

See application file for complete search history.

(56) References Cited

U.S. PATENT DOCUMENTS

| | | | |
|---|---|---|---|
| 4,796,482 A | | 1/1989 | Hiramitsu et al. |
| 5,423,391 A | | 6/1995 | Shimizu |
| 5,896,942 A | * | 4/1999 | Bohner et al. ................ 180/402 |
| 6,053,270 A | * | 4/2000 | Nishikawa et al. ........... 180/168 |
| 6,179,083 B1 | | 1/2001 | Yamauchi |
| 6,260,654 B1 | * | 7/2001 | Ito et al. ........................ 180/444 |
| 6,543,568 B2 | * | 4/2003 | Cole .............................. 180/428 |
| 6,659,218 B2 | * | 12/2003 | Thomas et al. ............... 180/402 |
| 6,837,824 B2 | * | 1/2005 | Reimann et al. .............. 475/343 |
| 7,004,048 B2 | | 2/2006 | Kobayashi et al. |
| 2002/0074182 A1 | * | 6/2002 | Cole .............................. 180/417 |
| 2002/0092699 A1 | * | 7/2002 | Worrell et al. ................ 180/443 |
| 2003/0066379 A1 | * | 4/2003 | Kobayashi et al. ............. 74/552 |
| 2004/0060766 A1 | * | 4/2004 | Hayakawa et al. ........... 180/444 |
| 2005/0072621 A1 | * | 4/2005 | Hara et al. .................... 180/444 |
| 2009/0250286 A1 | | 10/2009 | Leutner |

FOREIGN PATENT DOCUMENTS

| | | |
|---|---|---|
| CN | 2645999 Y | 10/2004 |
| CN | 2645999 Y | 10/2004 |
| DE | 36 19 340 C2 | 12/1986 |
| DE | 38 30 654 A1 | 11/1989 |
| DE | 43 26 355 A1 | 2/1994 |

(Continued)

OTHER PUBLICATIONS

English translation of the International Preliminary Report On Patentability issued by The International Bureau of WIPO on Jun. 19, 2008 for International Application No. PCT/DE2006/001151 (8 pages).

English translation of First Chinese Office Action for Chinese Patent Application No. 200680021364.1, issued on Feb. 13, 2009, 5pgs.

(Continued)

*Primary Examiner* — Tony H. Winner
*Assistant Examiner* — Jacob Knutson
(74) *Attorney, Agent, or Firm* — Fitch Tabin & Flannery (57) ABSTRACT

A steering device for a superposition steering system is provided using at least one actuator. The device is based on the object of producing a superposition steering system which requires no additional installation space in the steering column. The actuator for the superposition steering system is therefore arranged in the steering wheel.

17 Claims, 8 Drawing Sheets

FOREIGN PATENT DOCUMENTS

| | | |
|---|---|---|
| DE | 696 19 333 T2 | 7/2002 |
| DE | 101 60 313 A1 | 3/2003 |
| DE | 103 15 150 A1 | 10/2004 |
| DE | 10 2006 016 429 A1 | 10/2007 |
| JP | H07-172326 A | 7/1995 |
| JP | H11-198830 A | 7/1999 |
| JP | 2002-337708 A | 11/2002 |
| JP | 2003-118586 A | 4/2003 |
| JP | 2005-112025 A | 4/2005 |
| JP | 2005 199937 | 7/2005 |
| JP | 2004-182061 A | 7/2007 |

OTHER PUBLICATIONS

Notification of the Fourth Office Action issued in counterpart Chinese Application No. 200680021364.1 dated Aug. 11, 2010 (5 pages) and an English translation of the same (4 pages).

Office Action issued in counterpart Japanese Application No. 2008-521787 dated Sep. 22, 2010 (5 pages) and an English translation of the same (2 pages).

Office Action issued in counterpart Japanese Application No. 2008-521787 dated May 6, 2011 (2 pages) and an English translation of the same (1 page).

\* cited by examiner

STEERING DEVICE FOR A SUPERPOSITION STEERING SYSTEM

CROSS REFERENCE TO RELATED APPLICATIONS

This is a continuation application of prior application number PCT/DE2006/001151, filed Jun. 29, 2006 and claims the benefit under 35 U.S.C. §119 of prior foreign application number DE 10 2005 034 636.7, filed Jul. 20, 2005.

FIELD OF THE INVENTION

The invention relates to a steering device for a superposition steering system.

BACKGROUND OF THE INVENTION

Nowadays, motor vehicles are equipped as a rule with power steering systems. It is an object of the power steering system to reduce the steering force requirement, that is to say the torque which is to be applied by the driver for a change in driving direction. In known power steering systems, this takes place as a function of the engine speed, since the pump for the assisting hydraulic system is driven by the vehicle motor. Furthermore, it is known to drive the pumps by actuable electric motors, as a result of which speed-dependent steering force assistance is made possible. Here, the assisting action of a power steering system of this type decreases as the speed increases. At high speeds, the driver therefore has to introduce a greater moment via the steering wheel for a change in the steering lock than at low speeds. In systems of this type, the input moment is adapted, that is to say regulated, to the respective conditions.

Superposition steering systems are characterized in that a further angle can be superimposed by an actuator onto steering angles which are input by the driver. For instance, DE 101 60 313 A1 discloses a superposition gear mechanism for a superposition steering system. This superposition gear mechanism is arranged between an input shaft which is connected to the steering wheel and an output shaft which is connected to a steering gear. This superposition gear mechanism is assigned an adjusting motor, and together they form the actuator. This actuator has the disadvantage that it is arranged between an input shaft and an output shaft, with the result that additional installation space is required in the region of the steering column and therefore a special steering column is required.

SUMMARY OF THE INVENTION

The invention is based on the object of providing a superposition steering system which requires no additional installation space in the steering column. Furthermore, it is to be possible for an additional assembly to be installed, with the aid of which autonomous driving is optionally to be possible.

According to the invention, this is achieved according to the features described hereinafter.

In a steering device for a superposition steering system, using at least one actuator for the superposition steering system, the latter is arranged in the steering wheel according to the invention. This results in the advantage that no special steering column is required for the superposition steering system, in which steering column the assembly for the superposition steering system is additionally installed in steering devices of the prior art. The arrangement according to the invention can therefore be incorporated more readily into existing steering systems, since a conventional steering column having a power steering system can be used.

The actuator preferably has a worm gear mechanism and at least one motor for driving a worm gear. In one embodiment, the worm gear mechanism has a large worm gear which is connected coaxially to a steering shaft and the large worm gear is assigned two smaller worm gears which are connected to in each case one electric motor.

It is expedient that the large worm gear has a sleeve which engages over the steering shaft for connection to the steering shaft, the rotationally secure connection being effected via a steering wheel journal. The motors are preferably arranged at least partially in the spokes of the steering wheel.

Furthermore, it is expedient that the lead of the worm gear mechanism is of sufficient magnitude that there is self locking.

It is likewise expedient that activation of the motors which is dependent on the speed of the vehicle is provided, the steering lock being reduced at high speed and the steering lock being increased at low speed.

Steering lock is to be understood as the angular change in the steered wheels in the event of a change in driving direction.

In one preferred embodiment, a power steering system having a controllable input moment which reacts to the steering angle difference of the superposition steering system is arranged behind the actuator for the superposition steering system. In particular, a usual steering sensation is produced as a result. Here, regulation is provided which reduces the input moment of the power steering system if steering angles are added and increases it if steering angles are subtracted. Steering angle is understood to be the rotational angle of the steering shaft. Depending on the actuation of the superposition steering system, said steering angle can be equal to, greater than or smaller than the angle change which is initiated by the driver on the steering wheel.

In one embodiment, a force-transmitting, form-fitting or frictional connection is provided between the steering wheel and a component which is fixed to the vehicle, in order to fix the steering wheel.

It is expedient that the actuator is arranged above a steering wheel base, and that an electromagnetic friction clutch is arranged as steering wheel fixing means between the underside of the steering wheel base and a steering wheel casing.

In one preferred embodiment, the friction clutch has an annular clutch part which is guided by means of guide pins in an inwardly protruding section of the steering shaft casing.

In a further embodiment, at least one additional, programmable servoactuator which is connected to a component which is fixed to the vehicle, for example to the steering column receptacle, is provided between the superposition steering system which is situated in the steering wheel and the power steering system. The programmable servoactuator acts directly on the steering shaft, for example via gearwheel mechanisms. The programmable servoactuator therefore actuates the steering gear directly via the upper steering shaft and the following power steering system. The vehicle can be controlled autonomously via this servoactuator. Assistance functions which intervene in the steering events, for example automatic lane maintaining or automatic parking, can therefore be realized by way of this servoactuator. Since the servoactuator lies in front of the power steering system, the servoactuator can relieve the superposition steering system which is situated in the steering wheel, with the result that a smaller actuator can be installed for the superposition steering system.

There is provision in a further refinement for at least one actuating element to be assigned to the superposition steering system for setting the spacing between the axes of the worm gear and the worm of the actuator and/or to the housing, in which the worm gear and the worm are mounted, for introducing vibrations. For example, a piezoelectric actuator can be provided as actuating element.

The efficiency of the gear mechanism can be set as a result.

The piezoelectric actuator can therefore press the gear mechanism housing apart, in which the worm gears are mounted. This increases the axial spacing, as a result of which the play between the worm gears is likewise increased. As a result, the breakaway torque of the gear mechanism is reduced and the gear mechanism is set in motion more readily. As an alternative or in addition, the breakaway torque can be reduced by the vibration which is introduced by the piezoelectric actuator.

The housing can also be pressed together by means of the piezoelectric actuator. As a result, the axial spacing is reduced and the play between the worm gears is canceled completely, that is to say the gear mechanism is blocked and has reliable self locking.

Finally, the piezoelectric actuator can keep the worm gears at an optimum spacing for dynamic operation. In the favorable case, the axial spacing remains at the spacing which the gear mechanism assumes in the stressfree state of the actuator. Here, the gear mechanism runs with optimum play and optimum friction.

BRIEF DESCRIPTION OF THE DRAWINGS

The invention is to be explained in one exemplary embodiment using drawings, in which.

DETAILED DESCRIPTION OF THE PREFERRED EMBODIMENTS

Figure 1:
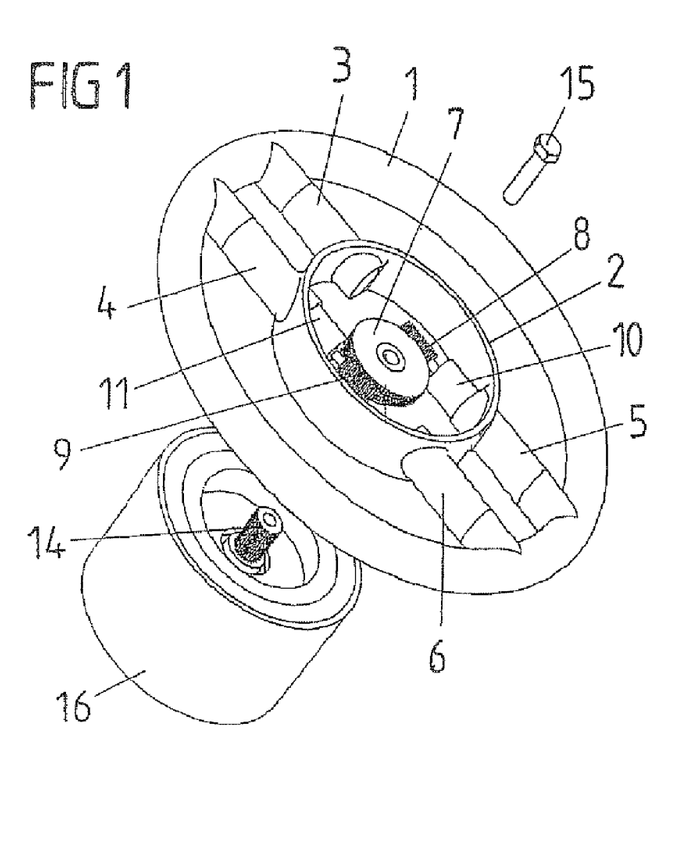
FIG. 1 shows a perspective view of the steering wheel according to the invention with an actuator.
Figure 2:
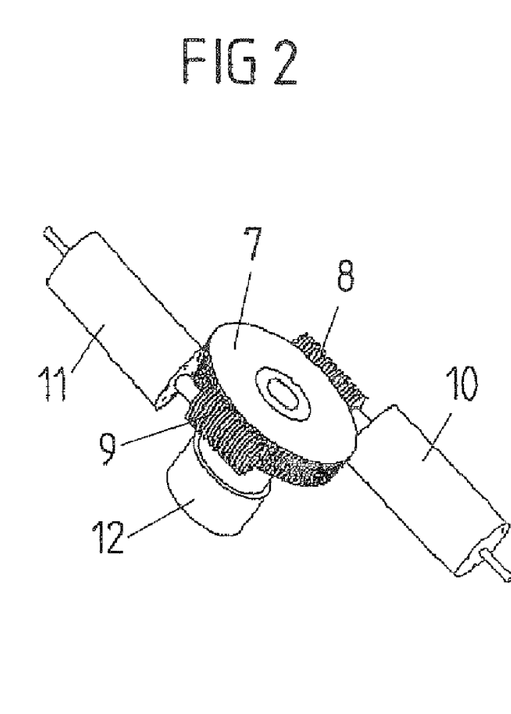
FIG. 2 shows a perspective view of the actuator from FIG. 1.
Figure 3:
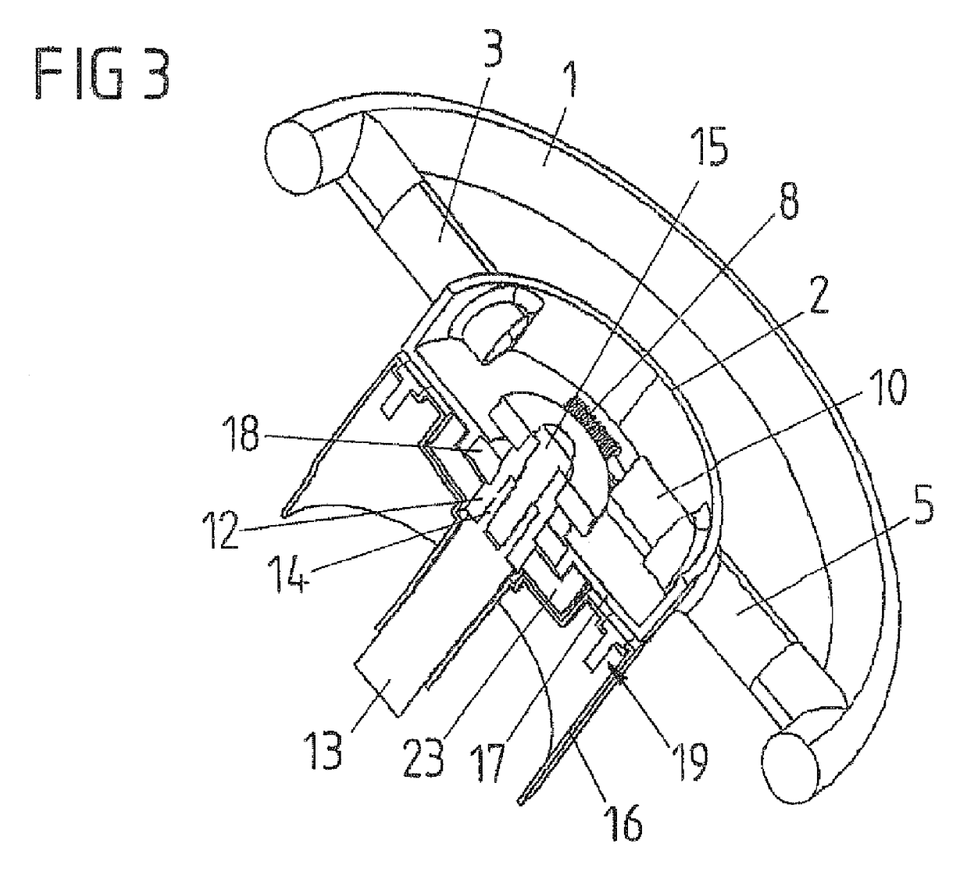
FIG. 3 shows a section through the steering wheel according to FIG. 1.

FIG. 1 shows a steering wheel which has a steering wheel rim 1 and a steering wheel hollow 2 which is shown in section, in order to make an actuator visible. The steering wheel rim 1 and the steering wheel hollow 2 are connected to one another by spokes 3, 4, 5, 6. The actuator has a large worm gear 7, two small worm gears 8, 9 and electric motors 10, 11 which are assigned to the latter. The electric motor 10 is a constituent part of the spoke 5, while the electric motor 11 is a constituent part of the spoke 4. The large worm gear 7 has a sleeve 12 (FIG. 2), by means of which the steering wheel can be fastened on a steering shaft 13 (FIG. 3). The sleeve 12 engages over a steering wheel journal 14 and the two are connected to one another by means of a screw 15.

Further details of the arrangement according to the invention can be seen from FIG. 3. The steering wheel hollow 2 has a steering wheel base 17, in which a ball bearing 18 is provided for mounting the sleeve 12. The steering shaft 13 is surrounded by a steering shaft casing 16, on which an electromagnetic friction clutch 19 is arranged as steering wheel fixing means on the side which faces the steering wheel base 17. Said electromagnetic friction clutch 19 is shown in detail in FIGS. 4 to 6. Furthermore, a steering angle sensor 23 is provided in the upper region of the steering shaft casing 16.

Figure 4:
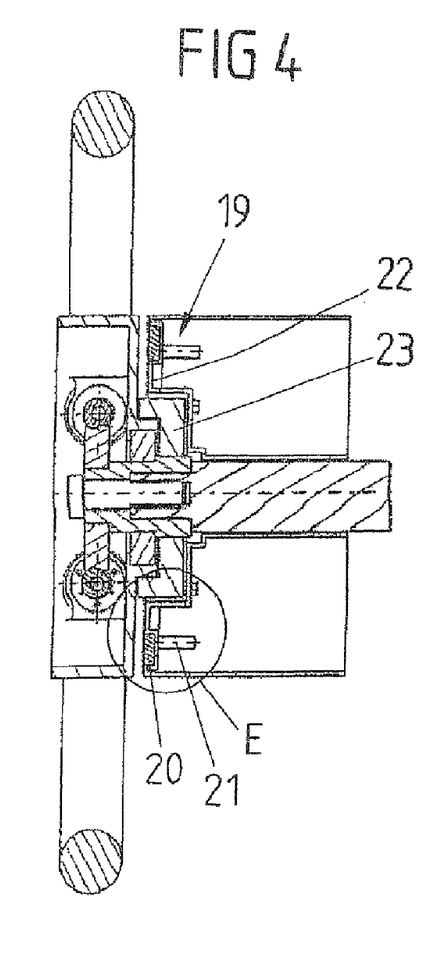
FIG. 4 shows a section through a steering wheel according to the invention with an electromagnetic friction clutch as steering wheel fixing means.
Figure 6:
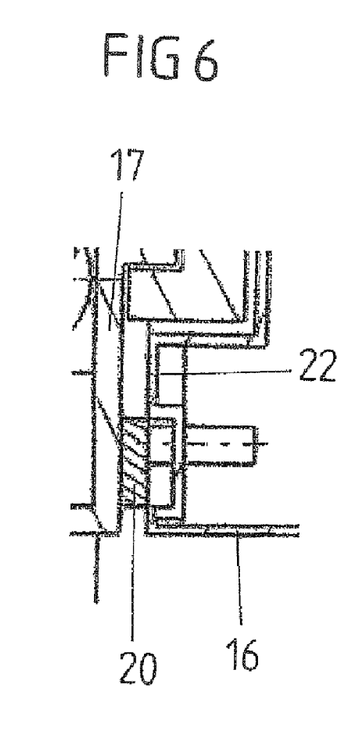
FIG. 6 shows the detail E of FIG. 4 with a closed clutch.

It can be seen from FIG. 4 that the friction clutch 19 has an annular clutch part 20 which is guided by means of guide pins 21 in an inwardly protruding section 22 of the steering shaft casing 16. There is the possibility of autonomous driving or ESP intervention in the steering by means of this friction clutch 19. The friction clutch fixes the steering wheel, which fixing is to be overcome by the driver. If autonomous steering is to take place, the clutch part 20 moves out of the section 22 of the steering shaft casing 16 and bears on the outside of the steering wheel base 17, as shown in FIG. 6. There is now a frictional connection between the steering wheel base 17 and therefore the steering wheel and the steering shaft casing 26. The necessary steering locks are then brought about by the superposition steering system.

Figure 5:
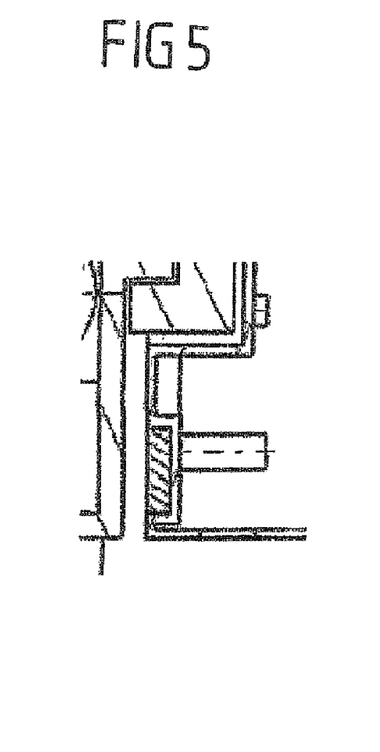
FIG. 5 shows the detail E of FIG. 4 with an open clutch.

If the driver suddenly wishes to input another steering angle, the system detects the friction or angle difference which is produced or the prevailing steering moment and moves the clutch back, as shown in FIG. 5.

Figure 7:
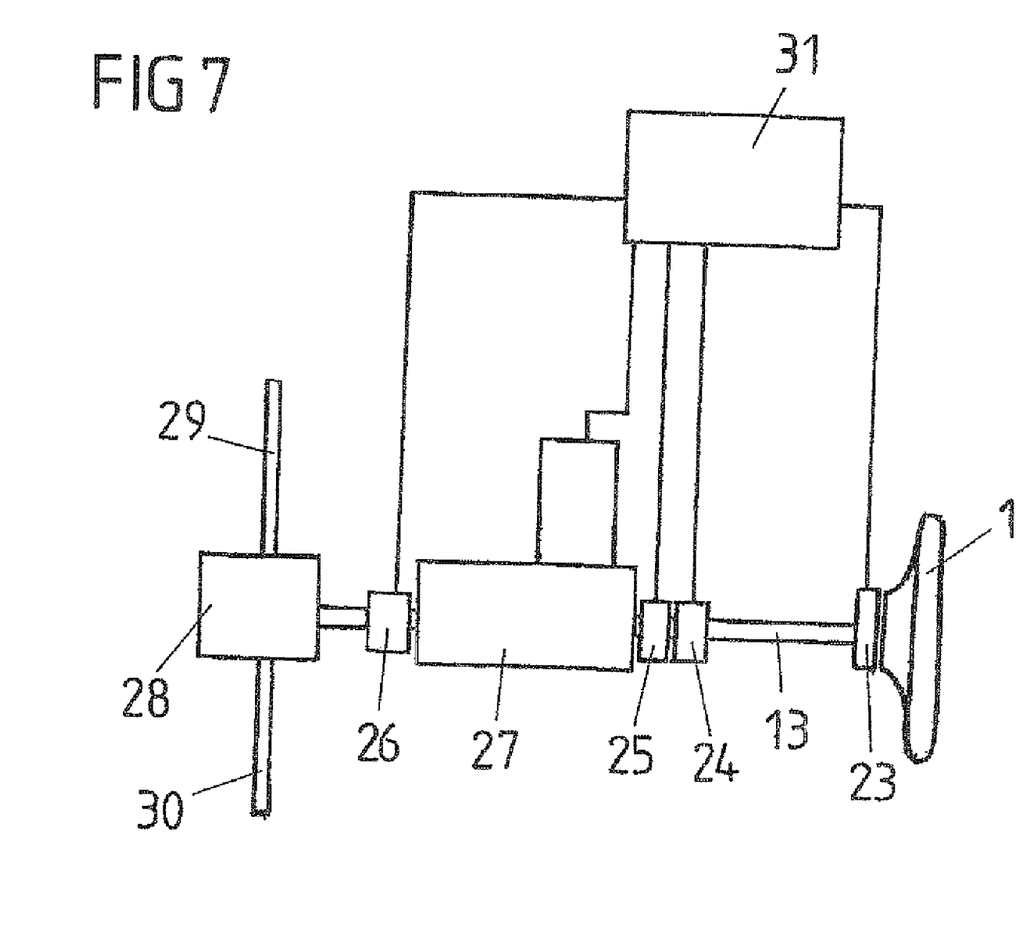
FIG. 7 shows a diagrammatic illustration of the overall steering system.

FIG. 7 shows the overall steering system, in which this steering wheel works. The steering wheel having the steering angle sensor 23 is fastened on the steering shaft 13, on which a further steering angle sensor 24 and sensors 25, 26 for the steering moment are provided. A servomotor 27 is arranged between the two last mentioned sensors. A steering gear 28 having drive shafts 29, 30 is provided at the end of the steering shaft 13 in a known manner. The steering angle sensors 23, 24, the sensors 25, 26 for the steering moment and the servomotor 27 are assigned control electronics 31 with software.

Figure 8:
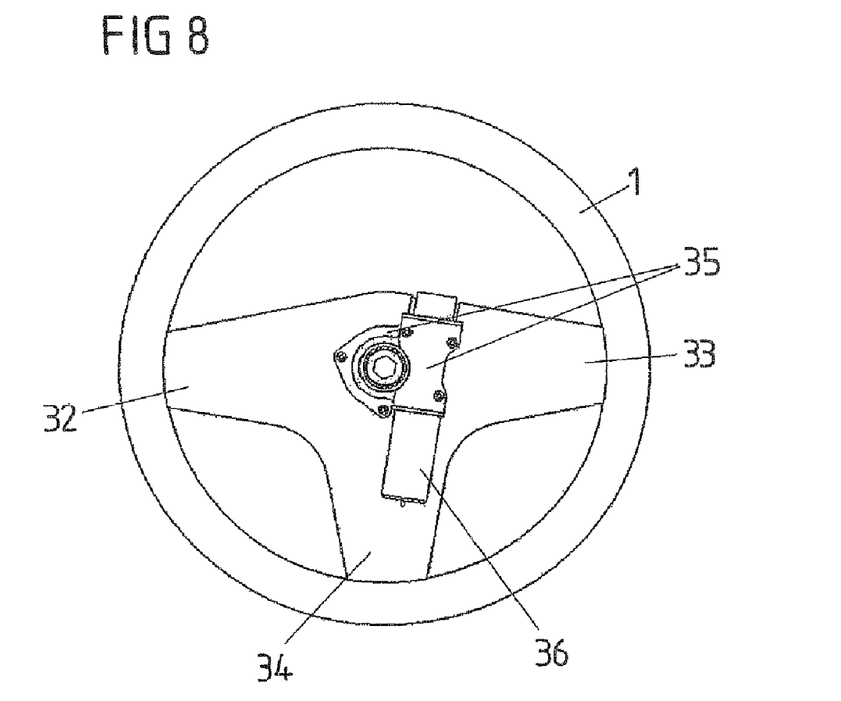
FIG. 8 shows one embodiment with an actuator in a three-spoke steering wheel, viewed from above.
Figure 9:
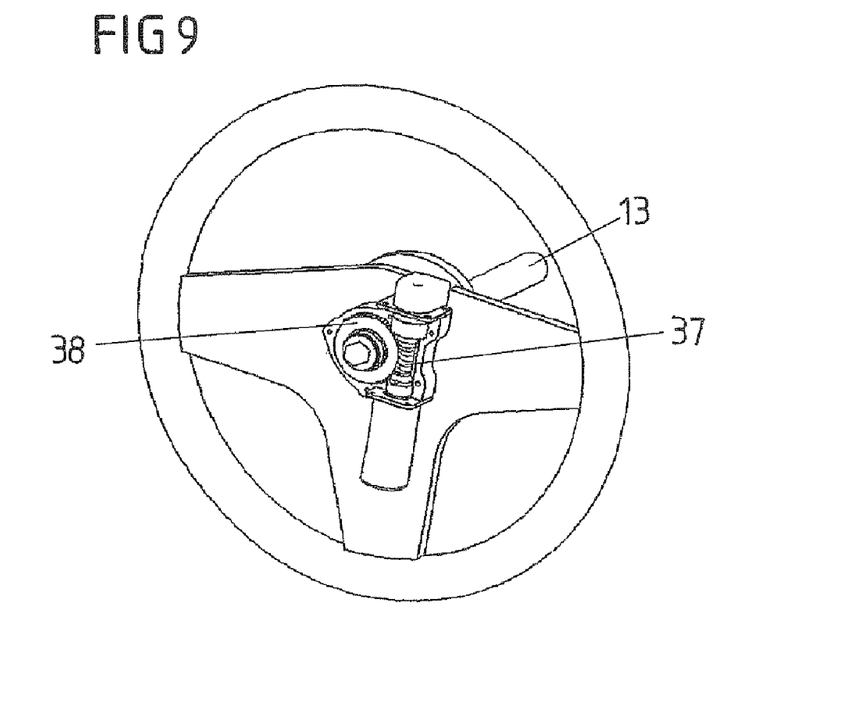
FIG. 9 shows a perspective view from the front of the embodiment according to FIG. 8.

In the embodiment of FIG. 8, a steering wheel is provided having a steering wheel rim 1 and three spokes 32, 33, 34. The actuator which comprises a gear mechanism which is arranged in a gear mechanism housing 35 and an electric motor 36 is arranged in the center of the steering wheel. As can be seen from FIG. 9, the gear mechanism has a worm 37 and a worm gear 38 which is connected to the steering shaft 13.

Figure 10:
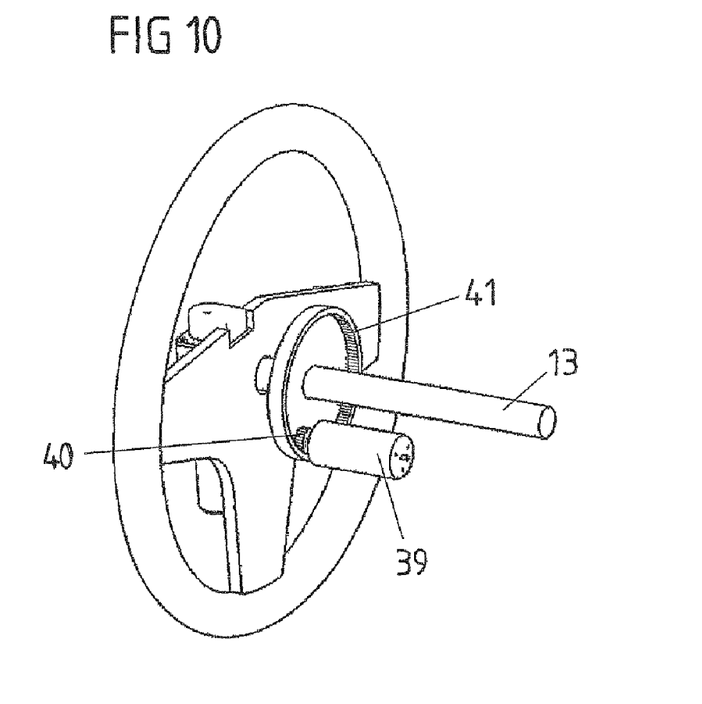
FIG. 10 shows a perspective view from the rear of the embodiment according to FIG. 8.

In the view of FIG. 10 which shows the embodiment of FIG. 8 perspectively from the rear, a second, so-called servoactuator having an electric motor 39 and an associated drive pinion 40 can be seen. In contrast to the first mentioned actuator, this servoactuator is arranged in a manner which is fixed to the vehicle in the region of the steering column (not shown). The drive pinion engages in a crown gear 41 which has an internal toothing system and is connected fixedly in terms of rotation to the steering shaft 13.

Figure 11:
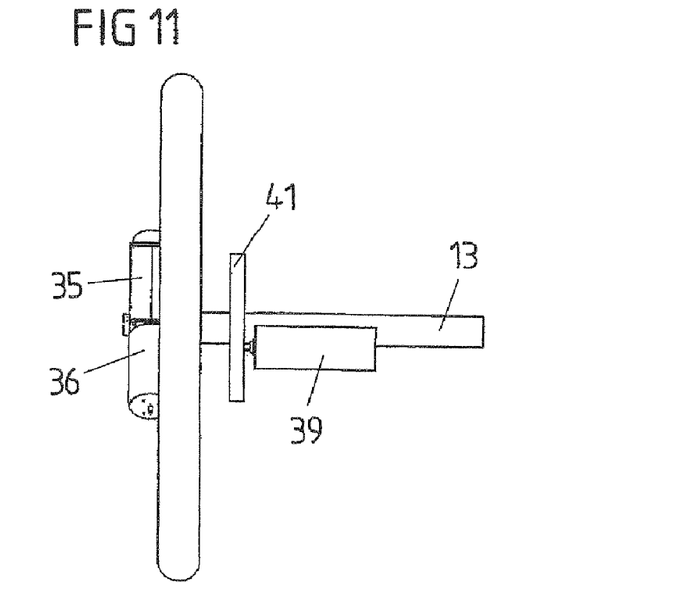
FIG. 11 shows a side view of the embodiment according to FIG. 8.

The assignment of the essential components of the two actuators can be seen again from the side view of FIG. 11. Since the servoactuator lies in front of the power steering system (not shown), the servoactuator can relieve the superposition steering system which is situated in the steering wheel, with the result that a smaller actuator 36, 37, 38 can be installed for the superposition steering system.

Figure 12:
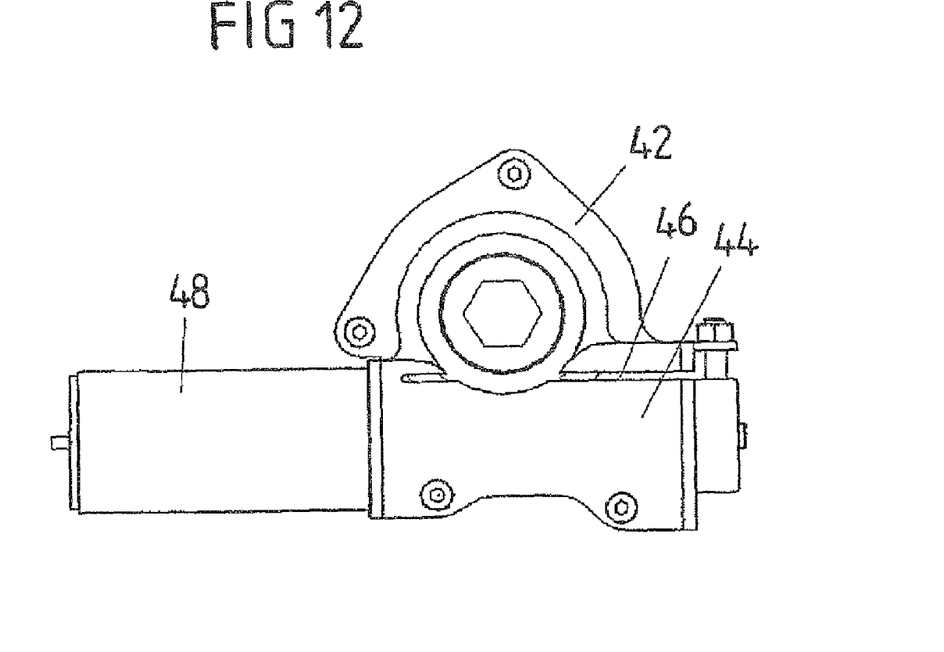
FIG. 12 shows one embodiment, in which the spacing between the axes of the worm gears of the actuator can be set, as viewed from above.
Figure 13:
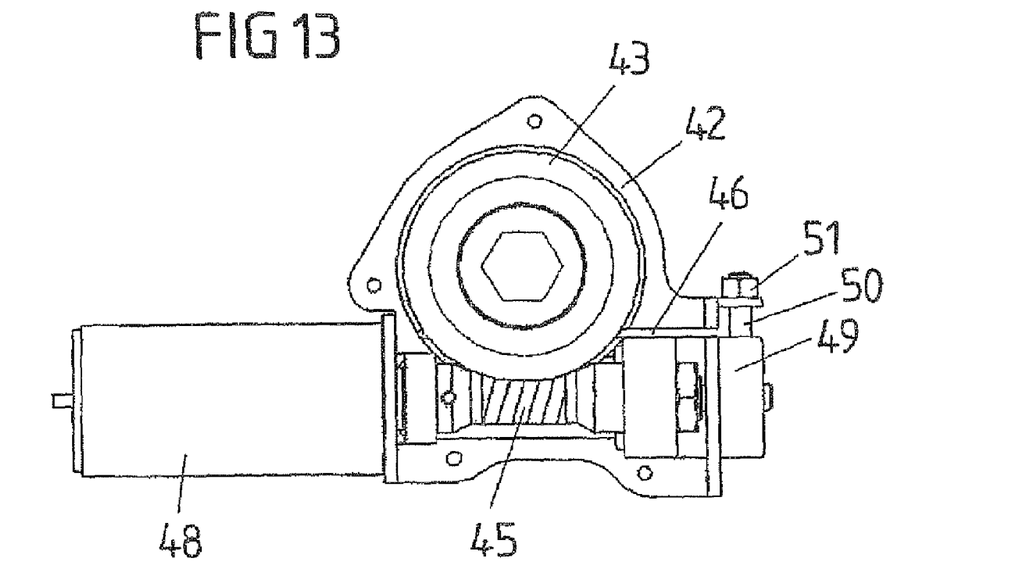
FIG. 13 shows the embodiment of FIG. 12 with an open gear mechanism housing.
Figure 15:
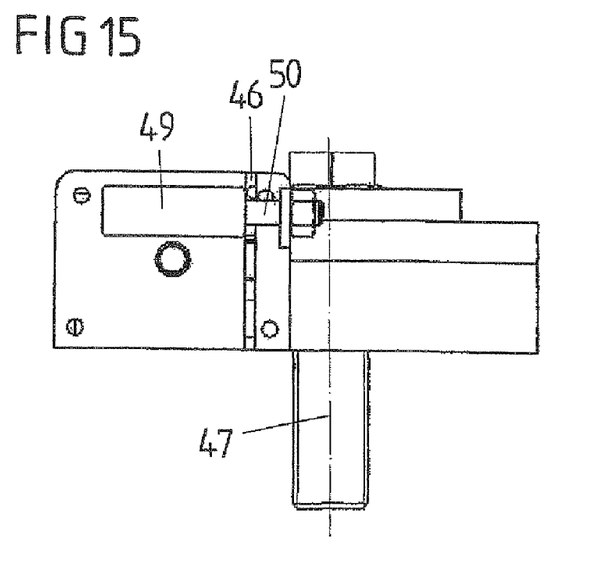
FIG. 15 shows a side view of the embodiment according to FIG. 12.

In the embodiment of an actuator which is integrated in the steering wheel according to FIG. 12, the gear mechanism housing which is shown in the closed state in this figure has two regions. There are therefore a gear mechanism housing region 42 for a worm gear 43 (FIG. 13) and a gear mechanism housing region 44 for a worm 45 (FIG. 13). The gear mechanism housing regions 42, 44 are divided by a gap 46 which penetrates the gear mechanism housing completely in a direction parallel to the steering shaft axis 47 (FIG. 15). The gear mechanism housing region 42 for the worm gear 43 is connected fixedly to the steering wheel (not shown). The worm 45 is assigned an electric motor 48.

An actuable actuating element 49 which bridges the gap 46, for example a piezoelectric actuator, is arranged on that end side of the gear mechanism housing which faces away from the electric motor 48. The width of the gap 46 in a plane which is defined by the two gear mechanism housing regions 42, 44 and therefore the play between the worm gear 43 and the worm 45 can be set by the activation of the actuating element 49. For this purpose, an actuator 50 extends in the direction of the gear mechanism housing region 42 from the actuating element 49 which is fastened to the gear mechanism housing region 44, and is connected fixedly to said gear mechanism housing region 42 there, for example by means of a screw connection 51. The width of the gap 46 can be changed by displacement of the actuator 50 in the actuating element 49 or by a change in the length of the actuator 50 if a piezoelectric actuator is used.

Figure 14:
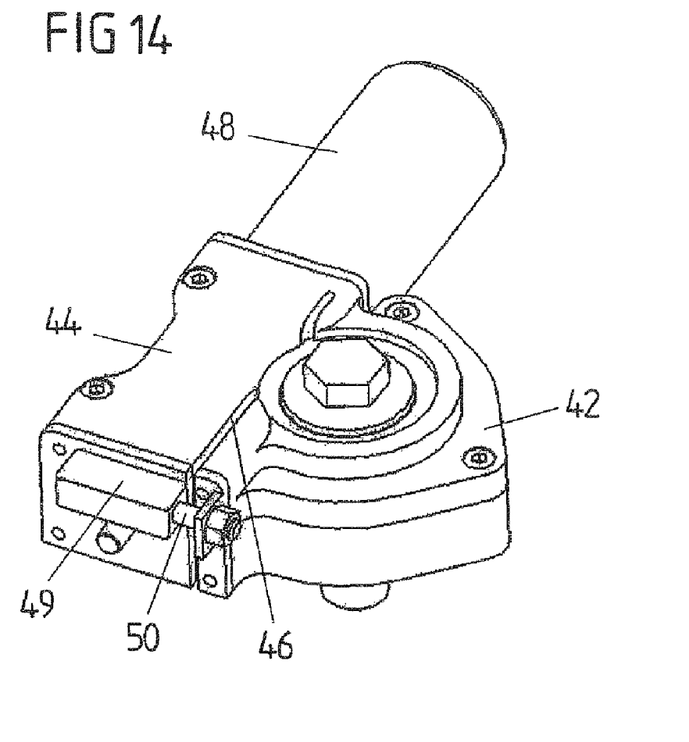
FIG. 14 shows a perspective view of the embodiment according to FIG. 12.

FIGS. 14 and 15 show the essential elements of the embodiment of FIG. 12 once again, from other viewing directions.

What is claimed is:

1. A steering device for a superposition steering system of a vehicle, comprising a rotatable steering shaft, a steering wheel fastened to the steering shaft for rotating the steering shaft with rotation of the steering wheel and with at least one actuator, characterized in that the actuator for the superposition steering system is arranged in the steering wheel and is configured to be operable to allow an angle of rotation of the steering wheel to be different than an angle of rotation of the steering shaft, the actuator has a worm gear mechanism including a large worm gear that has a circumference extending thereabout and toothing formed on the large worm gear that extends completely about the circumference thereof, and characterized in that the actuator has at least one motor for driving a driven worm gear engaged with the large worm gear.

2. The steering device as claimed in claim 1, characterized in that the large worm gear is connected coaxially to the steering shaft, and in that the driven worm gear comprises two smaller worm gears that are connected in each case to one electric motor and engaged with the large worm gear.

3. The steering device as claimed in claim 2, characterized in that the large worm gear has a sleeve which engages over the steering shaft for connection to the steering shaft, the rotationally secure connection being effected via a steering wheel journal.

4. The steering device as claimed in claim 2, characterized in that the motors are arranged at least partially in the spokes of the steering wheel.

5. The steering device as claimed in claim 1, characterized in that the lead of the worm gear mechanism is of sufficient magnitude that there is self locking.

6. The steering device as claimed in claim 2, characterized in that activation of the motors which is dependent on speed of the vehicle is provided, a steering lock being reduced at high speed and the steering lock being increased at low speed.

7. The steering device as claimed in claim 1, characterized in that a power steering system having a controllable input moment which reacts to the steering angle difference of the superposition steering system is arranged after the actuator for the superposition steering system.

8. The steering device as claimed in claim 7, characterized in that regulation is provided which reduces the input moment of the power steering system if steering angles are added and increases it if steering angles are subtracted.

9. The steering device as claimed in claim 1, characterized in that a non-positive, positively locking or frictional connection is provided between the steering wheel and a component which is fixed to the vehicle, in order to fix the steering wheel.

10. The steering device as claimed in claim 9, characterized in that the actuator is arranged above a steering wheel base, and in that an electromagnetic friction clutch is arranged as steering wheel fixing means between the underside of the steering wheel base and a steering shaft casing.

11. The steering device as claimed in claim 10, characterized in that the friction clutch has an annular clutch part which is guided by means of guide pins in an inwardly protruding section of the steering shaft casing.

12. The steering device as claimed in claim 7, characterized in that at least one additional, programmable servoactuator which is connected to a component which is fixed to the vehicle is provided between the superposition steering system which is situated in the steering wheel and the power steering system.

13. The steering device as claimed in claim 12, characterized in that the additional servoactuator is connected to a steering column receptacle.

14. The steering device as claimed in claim 1, characterized in that the actuator is assigned to a housing, in which the large worm gear and the driven worm gear are mounted, for setting the spacing between the axes of the large worm gear and the driven worm gear of the actuator of the superposition steering system and/or for introducing vibrations.

15. The steering device as claimed in claim 14, characterized in that the actuator is a piezoelectric actuator.

16. The steering device of claim 1, wherein the large worm gear has a cylindrical configuration.

17. The steering device of claim 3, wherein the sleeve is formed as a separate part.

* * * * *